US010832639B2

(12) United States Patent
Brkic et al.

(10) Patent No.: US 10,832,639 B2
(45) Date of Patent: Nov. 10, 2020

(54) METHOD OF AND APPARATUS FOR GENERATING A SIGNATURE REPRESENTATIVE OF THE CONTENT OF AN ARRAY OF DATA

(71) Applicant: ARM LIMITED, Cambridge (GB)

(72) Inventors: Toni Viki Brkic, Staffanstorp (SE); Jakob Axel Fries, Malmö (SE); Reimar Gisbert Döffinger, Lund (SE)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/214,800

(22) Filed: Jul. 20, 2016

(65) Prior Publication Data

US 2017/0024158 A1 Jan. 26, 2017

(30) Foreign Application Priority Data

Jul. 21, 2015 (GB) .................................. 1512828.3

(51) Int. Cl.

*G06F 12/00* (2006.01)
*G06F 13/00* (2006.01)
*G09G 5/393* (2006.01)

(52) U.S. Cl.

CPC ....... *G09G 5/393* (2013.01); *G09G 2320/103* (2013.01); *G09G 2350/00* (2013.01); *G09G 2360/122* (2013.01); *G09G 2360/16* (2013.01)

(58) Field of Classification Search

CPC ......... G09G 2320/103; G09G 2350/00; G09G 2360/122; G09G 2360/16; G09G 5/393

(Continued)

(56) References Cited

U.S. PATENT DOCUMENTS 4,849,978 A * 7/1989 Dishon ............... G06F 11/1008 714/6.1
5,007,053 A * 4/1991 Iyer ..................... G06F 11/1008 714/6.11

(Continued)

FOREIGN PATENT DOCUMENTS

CN 1834890 9/2006
CN 101116341 1/2008

(Continued)

OTHER PUBLICATIONS

Notice of Allowance dated Dec. 27, 2016 in co-pending U.S. Appl. No. 14/604,872, 11 pages.

(Continued)

*Primary Examiner* — Sheng Jen Tsai

(74) *Attorney, Agent, or Firm* — Nixon & Vanderhye P.C.

(57) ABSTRACT

A method and an apparatus for generating a signature representative of the content of a region of an array of data in a data processing system, where the region of the array of data comprising plural data positions, and each data position having an associated data value or values. A data value or values for a data position of the region of the data array is/are generated. The data value or values for the data position of the region of the data array is/are written to storage that stores the region of the data array as it is being generated. A signature representative of the content of the region of the data array is generated in parallel with the data value or values for the data position of the region of the data array being written to the storage.

20 Claims, 5 Drawing Sheets

(58) Field of Classification Search
USPC .......................................................... 711/154
See application file for complete search history.

(56) References Cited

U.S. PATENT DOCUMENTS 5,031,228 A * 7/1991 Lu ...................... G06K 9/00221 348/E17.001
5,129,074 A * 7/1992 Kikuchi .................. G06F 16/00 711/173
5,181,131 A 1/1993 Yamazaki et al.
5,241,656 A 8/1993 Loucks et al.
5,410,546 A * 4/1995 Boyer ..................... G06F 11/10 714/763
5,686,934 A 11/1997 Nonoshita et al.
5,793,428 A 8/1998 Coelho
6,003,765 A * 12/1999 Okamoto ............... G06Q 20/06 235/379
6,069,611 A 5/2000 Flynn et al.
6,075,523 A 6/2000 Simmers
6,094,203 A 7/2000 Desormeaux
6,101,222 A 8/2000 Dorricott
6,304,606 B1 10/2001 Murashita et al.
6,825,847 B1 11/2004 Molnar et al.
6,938,198 B1 * 8/2005 Purcell ................ H03M 13/091 714/758
7,069,381 B1 * 6/2006 Kiselev ............... G06F 11/1076 711/114
7,146,461 B1 * 12/2006 Kiselev ............... G06F 11/1076 711/114
7,190,284 B1 3/2007 Dye et al.
7,471,298 B1 * 12/2008 Noonburg ............ H04N 19/186 345/531
7,671,873 B1 3/2010 Pierini et al.
7,836,379 B1 * 11/2010 Ricci ................... G06F 11/1076 714/755
8,254,685 B2 8/2012 Greene et al.
8,533,483 B2 * 9/2013 Izu .......................... G06F 21/64 713/180
8,671,071 B1 * 3/2014 Brinson, Jr. .......... H04L 9/3247 707/602
8,749,711 B2 6/2014 Um
8,988,443 B2 3/2015 Croxford et al.
9,182,934 B2 11/2015 Croxford et al.
9,195,426 B2 11/2015 Croxford et al.
9,349,156 B2 5/2016 Croxford et al.
9,406,155 B2 8/2016 Oterhals et al.
9,436,722 B1 * 9/2016 Bent ................... G06F 16/2365
9,586,142 B2 * 3/2017 Danilak .............. G06F 16/2272
9,639,589 B1 * 5/2017 Theimer ................. G06F 16/27
9,654,510 B1 * 5/2017 Pillai ................... H04L 63/1416
9,767,125 B1 * 9/2017 Brinson, Jr. .......... H04L 9/3247
10,521,623 B2 * 12/2019 Rodriguez ......... G06Q 20/3672
2002/0036616 A1 3/2002 Inoue
2002/0184556 A1 * 12/2002 Hashemi ............. G06F 11/1076 714/5.11
2002/0188907 A1 * 12/2002 Kobayashi ............ G06F 3/0619 714/758
2003/0051150 A1 * 3/2003 Jung ..................... H04L 9/3236 713/189
2003/0080971 A1 5/2003 Hochmuth et al.
2003/0161398 A1 8/2003 Feder
2003/0222797 A1 * 12/2003 Futa ....................... G01C 21/26 340/995.18
2004/0044911 A1 * 3/2004 Takada .................. G01S 5/0027 713/170
2004/0141613 A1 7/2004 Hayashi
2004/0250071 A1 * 12/2004 Higashiura ............. G06F 21/64 713/170
2005/0123167 A1 * 6/2005 Maeno .................... G06T 1/005 382/100
2005/0131934 A1 * 6/2005 Gilbert ................... G06Q 10/10
2005/0131939 A1 6/2005 Douglis
2005/0168471 A1 8/2005 Paquette
2005/0204263 A1 * 9/2005 Ricci ................... H03M 13/091 714/758
2005/0285867 A1 12/2005 Brunner et al.
2005/0286560 A1 * 12/2005 Colman .................. H04L 29/06 370/474
2006/0050976 A1 3/2006 Molloy
2006/0152515 A1 7/2006 Lee et al.
2006/0188236 A1 8/2006 Kitagawa
2006/0203283 A1 9/2006 Fujimoto
2007/0005890 A1 1/2007 Gabel et al.
2007/0022420 A1 * 1/2007 Yamamoto ................ G06F 8/61 717/177
2007/0061582 A1 * 3/2007 Ohmori .................... H04K 1/00 713/176
2007/0083815 A1 4/2007 Delorme et al.
2007/0132771 A1 * 6/2007 Peer .......................... G06F 3/14 345/545
2007/0146380 A1 6/2007 Nystad et al.
2007/0188506 A1 8/2007 Hollevoet et al.
2007/0257925 A1 11/2007 Brunner et al.
2007/0261096 A1 11/2007 Lin et al.
2007/0273787 A1 11/2007 Ogino et al.
2007/0279574 A1 12/2007 Minamizaki
2008/0002894 A1 1/2008 Hayon et al.
2008/0059581 A1 3/2008 Pepperell
2008/0123747 A1 5/2008 Lee
2008/0143695 A1 6/2008 Juenemann et al.
2009/0033670 A1 2/2009 Hochmuth et al.
2009/0202176 A1 8/2009 Hwang et al.
2009/0282322 A1 * 11/2009 Wong .................. H03M 13/091 714/807
2010/0058229 A1 3/2010 Mercer
2010/0185926 A1 * 7/2010 Lawson ................ H04L 1/0061 714/807
2010/0332981 A1 12/2010 Lipton et al.
2011/0074765 A1 3/2011 Oterhals et al.
2011/0074800 A1 3/2011 Stevens et al.
2011/0080419 A1 4/2011 Croxford et al.
2011/0102446 A1 5/2011 Oterhals et al.
2012/0092451 A1 4/2012 Nystad et al.
2012/0159175 A1 * 6/2012 Yocom-Piatt ....... G06F 11/1453 713/176
2012/0176386 A1 * 7/2012 Hutchins ................... G06T 1/20 345/522
2012/0206461 A1 8/2012 Wyatt et al.
2012/0268480 A1 10/2012 Cooksey et al.
2012/0293545 A1 11/2012 Engh-Halstvedt et al.
2013/0033728 A1 * 2/2013 Hinds ................ G06K 15/1886 358/1.16
2013/0054919 A1 * 2/2013 Auvenshine .......... G06F 3/0608 711/165
2013/0067344 A1 3/2013 Ungureanu et al.
2013/0142447 A1 * 6/2013 Park ........................ G06T 9/004 382/233
2013/0262612 A1 * 10/2013 Langas ................. G06F 3/0605 709/211
2014/0152891 A1 * 6/2014 Gilbert ............... G06K 9/00744 348/441
2014/0192075 A1 * 7/2014 Stamoulis .............. G09G 5/393 345/549
2014/0219041 A1 * 8/2014 Kim ....................... G11C 29/00 365/200
2014/0317350 A1 * 10/2014 Langas ................. G06F 3/0626 711/115
2014/0337301 A1 * 11/2014 Jang ...................... G06F 16/254 707/698
2015/0187123 A1 7/2015 Hwang et al.
2015/0194136 A1 * 7/2015 Diard .................. G06F 9/45533 345/547
2015/0288704 A1 * 10/2015 Huang .................... G06F 21/64 726/4
2016/0021384 A1 1/2016 Croxford et al.
2016/0337083 A1 * 11/2016 Englert ................. H04L 1/0061
2017/0192053 A1 * 7/2017 Jacquet .............. G01R 31/3177
2017/0286313 A1 * 10/2017 Jiang ....................... G06F 3/061
2017/0351897 A1 * 12/2017 Kremin ................ G06K 9/0002

(56) References Cited

U.S. PATENT DOCUMENTS

| | | | | |
|---|---|---|---|---|
| 2018/0165781 | A1* | 6/2018 | Rodriguez | G06K 7/10297 |
| 2018/0176017 | A1* | 6/2018 | Rodriguez | H04L 63/08 |
| 2018/0181964 | A1* | 6/2018 | Zagarese | G06Q 20/40145 |

FOREIGN PATENT DOCUMENTS

| | | | |
|---|---|---|---|
| EP | 1 035 536 | A2 | 9/2000 |
| EP | 1 484 737 | A1 | 12/2004 |
| JP | 63-298485 | | 12/1988 |
| JP | 05266177 | A | 3/1992 |
| JP | 5-227476 | | 9/1993 |
| JP | 11-328441 | | 11/1999 |
| JP | 11-355536 | | 12/1999 |
| JP | 2004-510270 | | 4/2004 |
| JP | 2005-195899 | | 7/2005 |
| JP | 2006-268839 | | 10/2006 |
| JP | 2007-81760 | | 3/2007 |
| JP | 2007-531355 | | 11/2007 |
| WO | WO 02/27661 | A2 | 4/2002 |
| WO | WO 2005/055582 | A2 | 6/2005 |
| WO | WO 2008/026070 | | 3/2008 |
| WO | WO 2014/088707 | | 6/2014 |

OTHER PUBLICATIONS

U.S. Appl. No. 12/588,459, filed Oct. 15, 2009; Inventor: Oterhals et al.

U.S. Appl. No. 12/588,461, filed Oct. 15, 2009; Inventor: Stevens et al.

U.S. Appl. No. 13/435,733, filed Mar. 30, 2012; Inventor: Cooksey et al.

U.S. Appl. No. 14/604,872, filed Jan. 26, 2015; Inventor: Croxford.

U.S. Appl. No. 14/793,907, filed Jul. 8, 2015, Inventor: Croxford et al.

U.S. Appl. No. 15/254,280, filed Sep. 1, 2016, Inventor: Croxford et al.

Patent Trial and Appeal Board Decision mailed Sep. 28, 2016 in co-pending U.S. Appl. No. 12/588,459, 7 pages.

Examiner's Answer dated Apr. 3, 2014 in co-pending U.S. Appl. No. 12/588,459, 10 pages.

Final Office Action dated Jul. 2, 2013 in co-pending U.S. Appl. No. 12/588,459, 24 pages.

Office Action dated Jan. 22, 2013 in co-pending U.S. Appl. No. 12/588,459, 20 pages.

Final Office Action dated Aug. 29, 2012 in co-pending U.S. Appl. No. 12/588,459, 29 pages.

Office Action dated Feb. 21, 2012 in co-pending U.S. Appl. No. 12/588,459, 29 pages.

Examiner's Answer dated Feb. 18, 2016 in co-pending U.S. Appl. No. 12/588,461, 7 pages.

Final Office Action dated Feb. 24, 2015 in co-pending U.S. Appl. No. 12/588,461, 25 pages.

Office Action dated Jul. 22, 2014 in co-pending U.S. Appl. No. 12/588,461, 24 pages.

Final Office Action dated Dec. 3, 2013 in co-pending U.S. Appl. No. 12/588,461, 18 pages.

Office Action dated Jun. 5, 2013 in co-pending U.S. Appl. No. 12/588,461, 20 pages.

Office Action dated Feb. 17, 2012 in co-pending U.S. Appl. No. 12/588,461, 20 pages.

Examiner's Answer dated Oct. 26, 2016 in co-pending U.S. Appl. No. 13/435,733 40 pages.

Final Office Action dated Jan. 4, 2016 in co-pending U.S. Appl. No. 13/435,733 37 pages.

Office Action dated Apr. 2, 2015 in co-pending U.S. Appl. No. 13/435,733, 39 pages.

Final Office Action dated Jun. 17, 2014 in U.S. Appl. No. 13/435,733 25 pages.

Office Action dated Dec. 20, 2013 in U.S. Appl. No. 13/435,733, 28 pages.

Office Action dated Jul. 12, 2016 in co-pending U.S. Appl. No. 14/604,871, 26 pages.

UK Search Report dated Jan. 23, 2015 issued in GB 1412520.7, 3 pages.

UK Combined Search and Examination Report dated Jan. 12, 2016 in GB 151.2828.3, 5 pages.

UK Combined Search and Examination Report dated Jul. 27, 2012 in GB1205846.7, 6 pages.

UK Search Report in GB 0916924.4, dated Jan. 15, 2010, 3 pages.

UK Combined Search and Examination Report dated Jan. 26, 2011 in GB 1016162.8, 6 pages.

UK Combined Search and Examination Report dated Jan. 26, 2011 in GB 1016165.1, 6 pages.

Japanese Office Action issued in Japanese Patent Application No. 2010-213509 dated Jun. 23, 2014 (w/ translation)—7 pp.

Chinese First Office Action dated Jun. 11, 2014 in CN 201010294392.9 and English translation, 17 pages.

Chinese First Office Action dated Jul. 31, 2014 in CN 201010294382.5 and English translation, 54 pages.

English Translation of Japanese Official Action dated Apr. 7, 2014 in Japanese Application No. 2010-213508; Japanese Office Action dated Apr. 7, 2014 in Japanese Application No. 2010-213508.

Cambridge in Colour, "Digital Image Interpolation" 2015 (retrieved Jul. 26, 2016), 12 pages.

P. Turcza et al, "Hardware-Efficient Low-Power Image Processing System for Wireless Capsule Endoscopy" *IEEE Journal of Biomedical and health Informatics*, vol. 17, No. 6, Nov. 2013, pp. 1046-1056.

S.J. Carey et al, "Demonstration of a Low Power Image Processing System using a SCAMP3 Vision Chip" IEEE, Aug. 2011, 2 pages.

Pixelplus Co., Ltd., "Ultra Low-Power & Image-Processing Processor" Brief Sheet, Rev. 2.0, Image ARM Processor, Oct. 27, 2008, 14 pages.

Y. Asada, "Low-Power Technology for Image-Processing LSIs" FUJITSU Sc. Tech. J., vol. 49, No. 1, Jan. 2013, pp. 117-123.

G. Haim et al, "Optimization of Image Processing Algorithms: A Case Study" Feb. 9, 2012, 16 pages.

Bergsagel, Jonathan, et al., "Super high resolution displays empowered by the OMAP4470 mobile processor: WUXGA resolution tablets now becoming a reality for the Android ecosystem", Texas Instruments, Dallas, Texas, Jan. 2012, pp. 1-16.

Khan, Moinul H., et al., "Bandwidth-efficient Display Controller for Low Power Devices in Presence of Occlusion", Consumer Electronics, ICCE 2007, Digest of Technical Papers, International Conference on Jan. 10-14, 2007 (2 pages).

Park, Woo-Chan, et al., "Order Independent Transparency for Image Composition Parallel Rendering Machines", P.-C. Yew and J. Xue (Eds.): A CSA 2004, LNCS 3189, Sep. 7-9, 2004, pp. 449-460.

Heade, T., et al., "HDR Image Composition and Tone Mapping on the Cell Processor", MSc Interactive Entertainment Technology, Trinity College Dublin, Graphic Vision and Visualisation GV2 group, Dec. 11, 2009, pp. 59-66.

"Composition Processing Cores (CPC)", http://www.vivantecorp.com/index.php/en/technology/composition.html, (2 pages) retrieved Aug. 20, 2014.

XDamage Extension, http://www.freedesktop.org/wiki/Software/XDamage/?action=print, last edited May 18, 2013, 2 pages.

Creating a polygon shape from a 2d tile array, mhtml://X:\Documents and Settings\jtothill.DEHNS.002\Local Settings\Temporar . . . , last edited Oct. 5, 2009, 3 pages.

Android-eepc / base, https://gitorious.org/android-eepc/base/source/ . . . , 2007 © retrieved Nov. 12, 2013, 9 pages.

"Qt source code", 2013 ©, retrieved Nov. 12, 2013, 264 pages https://qt.gitorious.org/qt/qt/source/427e398a7b7f3345fb4dcbc275b3ea29f211851b:src/gui/kernel/qwidget.cpp.

EGL (OpenGL), http://en.wikipedia.org/wiki/EGL_(OpenGL), last edited Sep. 21, 2012, 2 pages.

Shim et al., *A Compressed Frame Buffer to Reduce Display Power Consumption in Mobile Systems*, IEEE, Asia and South Pacific Design Automation Conference (ASP-DAC'04) Jan. 27-30, 2004, pp. 819-824.

(56) References Cited

OTHER PUBLICATIONS

Shim, *Low-Power LCD Display Systems*, School of Computer Science and Engineering, Seoul National University, Korea, 2006, 2 pages.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Chamoli, Deduplication—A Quick Tutorial, Aug. 8, 2008, http://theoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003, 15 pages.
Carts-Powell, Cholesteric LCDs Show Images After Power is Turned Off; OptoIQ, Sep. 1, 1998, 5 pages.
Zhong et al., Energy Efficiency of Handheld Computer Interfaces Limits, Characterization and Practice, Jun. 6, 2005, pp. 247-260.
Patel et al., Frame Buffer Energy Optimization by Pixel Prediction, Proceedings of the 2005 International Conference on Computer Design, Jun. 2005, 4 pages.
R. Patel et al., Parallel Lossless Data Compression on the GPU, 2012 IEEE, 10 pages, In Proceedings of Innovative Parallel Computing (InPar '12). May 13-14, 2012. San Jose, California.
Smalley, ATI's Radeon X800 Series Can Do Transparency AA Too, Sep. 29, 2005, 2 pages.
Esselbach, Adaptive Anti-Aliasing on ATI Radeon X800 Boards Investigated, Oct. 17, 2005, 4 pages.
Digital Visual Interface DVI, Revision 1.0, Digital Display Working Group, Apr. 2, 1999, pp. 1-76.
Ma, OLED Solution for Mobile Phone Subdisplay, Apr. 2003, 5 pages.
Z. Ma et al., Frame Buffer Compression for Low-Power Video Coding, 2011 18$^{th}$ IEEE International Conference on Image Processing, 4 pages, Date of conference: Sep. 11-14, 2011.
M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.
T.L. Bao Yng et al., Low Complexity, Lossless Frame Memory Compression Using Modified Hadamard Transform and Adaptive Golomb-Rice Coding, IADIS International Conference Computer Graphics and Visualization 2008, Jul. 15, 2008, pp. 89-96.
A.J. Penrose, Extending Lossless Image Compression, Technical Report No. 526, Dec. 2001, pp. 1-149.
M. Ferretti et al., A Parallel Pipelined Implementation of LOCO-I for JPEG-LS, 4 pages; Date of conference: Aug. 23-26, 2004.
Jbarnes' braindump :: Intel display controllers; Jan. 26, 2011; http://virtuousgeek.org/blog/index.php/jbarnes/2011/01/26/intel_display_controllers; 5 pages, Jan. 26, 2011.
Quick Look at the Texas Instruments TI OMAP 4470 CPU, Kindle Fire HD CPU, http://www.arctablet.com/blog/featured/quick-look-texas-instruments-ti-omap-4470-cpu; posted Sep. 6, 2012 in Archos Gen10 CPU TI OMAP TI OMAP 4470; 12 pages; Sep. 6, 2012.
Vesa Digital Packet Video Link Standard, Video Electronics Standards Association, Version 1, Apr. 18, 2004, 86 pages.
http://www.cs.waseda.ac.jp/gcoe/jpn/publication/symposium/img/S1-4XJin.pdf. Applicant has advised that this web address is no longer active and that a copy of the document is not available to the Applicant or inventors.
Office Action dated Dec. 19, 2017 in co-pending U.S. Appl. No. 15/254,280, 20 pages.
Office Action dated Aug. 24, 2017 in co-pending U.S. Appl. No. 14/793,907 22 pages.
Decision on Appeal mailed Feb. 2, 2017 in co-pending U.S. Appl. No. 12/588,461, 10 pages.
Office Action dated Feb. 13, 2017 in co-pending U.S. Appl. No. 12/588,459, 41 pages.
Final Office Action dated Mar. 13, 2018 in co-pending U.S. Appl. No. 14/793,907 18 pages.
Office Action dated May 25, 2018 in co-pending U.S. Appl. No. 15/254,280 15 pages.
Final Office Action dated Apr. 26, 2019 in co-pending U.S. Appl. No. 15/254,280 17 pages.
Office Action dated Sep. 23, 2019 in co-pending U.S. Appl. No. 15/254,280 15 pages.
Final Office Action dated May 7, 2020 in co-pending U.S. Appl. No. 15/254,280 18 pages.

* cited by examiner

METHOD OF AND APPARATUS FOR GENERATING A SIGNATURE REPRESENTATIVE OF THE CONTENT OF AN ARRAY OF DATA

This application claims priority to GB Patent Application No. 1512828.3 filed 21 Jul. 2015, the entire content of which is hereby incorporated by reference.

BACKGROUND

The technology described herein relates to a method of and an apparatus for generating a signature representative of the content of an array of data in a data processing system. In particular, the technology described herein relates to a method of and an apparatus for generating a signature that is representative of the content of a region of a data array, such as a region of a frame to be displayed in a data processing system.

The Applicants have previously proposed, for example in their UK Patent Nos. 2474114 and 2474115, using signatures (information) representative of the content of respective regions of frames to be displayed to assess the similarity or otherwise between respective regions of the same or different frames, e.g. in a sequence of frames to be displayed. In these arrangements, if it is determined from the signature comparison that a new frame region is similar to another (e.g. preceding) frame region, then, for example, the other (e.g. preceding) frame region is reused in place of the new frame region, thereby, e.g., avoiding the need to write the new frame region to memory (with a commensurate saving of memory bandwidth, etc., as that write operation is avoided).

The Applicants believe that there remains scope for improved techniques for generating signatures (information) representative of the content of all or part of an array of data (such as a region of a frame to be displayed), for example for use in the Applicant's earlier proposals.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
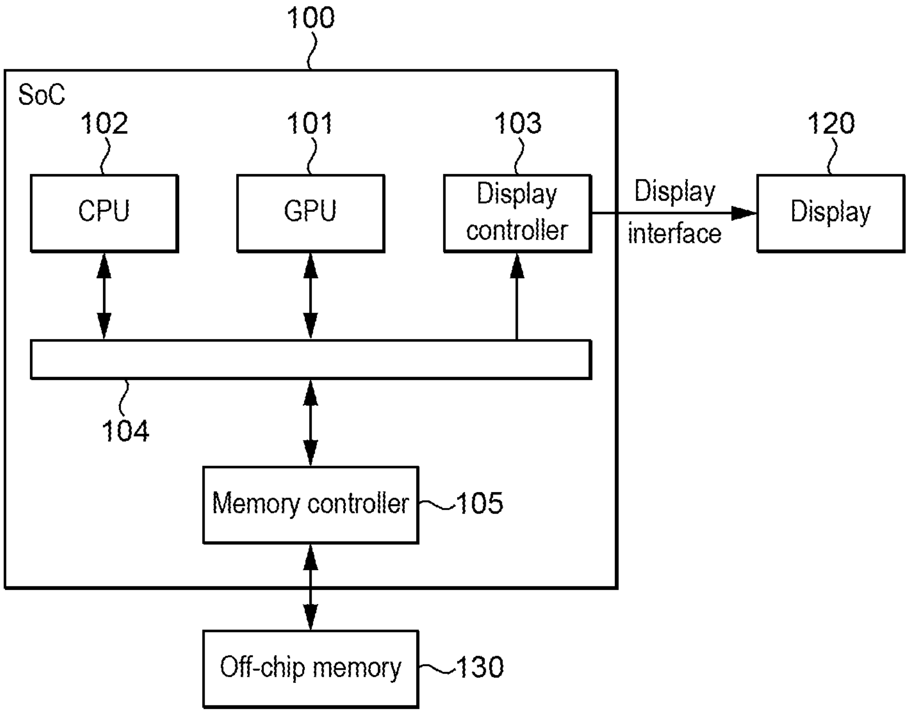
FIG. 1 shows an embodiment of a data processing system.

A first embodiment of the technology described herein comprises a method of generating a signature representative of the content of a region of an array of data in a data processing system, the region of the array of data comprising plural data positions, each data position having an associated data value or values, the method comprising:

generating a data value or values for a data position of the region of the data array;

writing the data value or values for the data position of the region of the data array to storage that stores the region of the data array as it is being generated; and generating a signature representative of the content of the region of the data array in parallel with the data value or values for the region of the data array being written to the storage.

A second embodiment of the technology described herein comprises an apparatus for generating a signature representative of the content of a region of an array of data in a data processing system, the region of the array of data comprising plural data positions, each data position having an associated data value or values, the apparatus comprising:

data value generating circuitry that generates data values for data positions of a region of a data array to be generated;

storage for storing the data values for a region of a data array as the region of the data array is being generated;

write circuitry that writes the generated data values for data positions of a region of a data array to the storage that stores the region of the data array as it is being generated; and signature generation circuitry that generates a signature representative of the content of a region of a data array that is being generated and stored in parallel with the writing of a data value or values for the region of the data array to the storage.

The technology described herein relates to arrangements in which a data array that comprises data positions each having respective data values associated with them (such as a frame to be displayed) is being generated and stored. In the technology described herein, signatures representative of the content of given regions of the data array are generated. However, the signature for a given region of the data array is generated as the data values for the region of the data array are being generated and written to storage (in contrast, for example, to waiting until the final version of the region of the data array has been completely generated and stored before generating a content-indicating signature for the region of the data array).

This has the advantage that, for example, the content-indicating signature for the region of the data array can be ready for use effectively immediately upon completion of the generation and storing of the region of the data array, rather than that having to be a process that is performed after the generation and storage of the final version of the region of the data array. The technology described herein can also avoid the need to provide, for example, intermediate storage, such as a buffer, that may be required for the signature generation process.

Thus, the technology described herein can reduce the time required to complete the generation of a signature for a region of a data array, and, also, can reduce the hardware requirements for the signature generation operation in a data processing system.

The data array that the content-indicating signature is being generated for can be any data array that is made up of plural data positions. In an embodiment, the data array is a frame (image) to be displayed. In an embodiment the data array is a render target output of a graphics processing system, such as, and in an embodiment, a frame to be displayed. In this case, each data position of the data array will correspond to a respective sampling position (e.g. pixel)

of the render output (e.g. frame), and will have an associated data value or values associated with it, such as a set of colour (RGB or RGBα) values.

The technology described herein can also be used for other forms of render output, such as graphics textures (in a render-to-texture operation), if desired.

The data values for the data positions in the data array may be generated as desired, e.g. depending upon what data the data array is to represent. In the case of a render output of a graphics processing system, the data values for the data array (the render target output) will be generated by a graphics processing unit (pipeline) rendering appropriate data values to respective data positions (sampling positions) within the render target (and thus the data value generating circuitry will comprise a graphics processing pipeline, e.g., and in an embodiment, at least a rasteriser and a renderer of a graphics processing pipeline).

The region of the data array (e.g. frame) that is considered in the technology described herein can be any suitable and desired region. Thus a data array region could comprise the entire data array (e.g. frame) (i.e. such that each, e.g. frame, will have a single region comprising the entire frame) (and in one embodiment this is what is done).

In an embodiment, each data array (e.g. frame) region is a smaller part (area) of the overall data array (e.g. frame), i.e. each region represents some but not all of the data array (e.g. frame) in question. Where a data array (e.g. frame) is divided into plural regions, each region is in an embodiment the same size and/or shape, but this is not essential.

In this case, the smaller regions that the data array is divided into can be any desired and suitable size or shape, but are in an embodiment rectangular (including square), and in an embodiment 8×8, 16×16 or 32×32 data (e.g. sampling) positions in size.

In an embodiment, each data array region corresponds to one or more "processing" tiles that the data array (e.g. frame) is divided into for processing purposes, for example to a tile (or tiles) that a graphics processor, video engine, image processor, display controller, composition engine, etc. that is generating or processing the, e.g. frame, in question operates on and produces as its output. In an embodiment, a region corresponds to a single processing tile, but may be made up of a set of plural "processing" tiles, or comprise only a sub-portion of a processing tile, if desired.

Other arrangements for dividing a data array into regions are of course possible.

The data values for the data array (e.g. frame) region may be stored in any suitable and desired storage after they are generated (e.g. rendered) while the data array region is being generated. They are, in an embodiment, stored in a buffer that stores the data array region as it is being generated, such as, and in an embodiment, in the case of a tile-based graphics processing pipeline, a tile buffer. The data array region is in an embodiment stored in a local (on chip) buffer of the processor that is generating the region (e.g. of the graphics processor).

The signature representative of the content of the region of the data array can comprise any suitable and desired information that is representative of and/or characteristic of the content of (i.e. of the data values for) the data array region.

In an embodiment, the signature is based on or derived from the content of (the data values for) the respective region of the data array, and is in an embodiment generated from or using the content of (the data values for) the region in question.

Thus the content-indicating "signature" may comprise, for example, any suitable set of derived information that can be considered to be representative of the content of (of the data values for) the region, such as a checksum, a CRC, or a hash value, etc., derived from (generated for) the data values for the region in question. Suitable signatures include standard CRCs, such as CRC64, or other forms of signature such as MD5, SHA 1, etc. In an embodiment, the signature is a CRC value or a hash value that is derived using the data values for the data array region.

The signature representing the content of the region of the data array may be generated as data values are generated and stored for respective positions within the data array region as desired. In the case where respective individual data position data values are generated and then written to the stored data array region one after another (e.g. as would be the case for a render output such as a frame being generated by a graphics processing system), then, in an embodiment, a new version of the signature is generated as each new data value (or set of data values) is written to the stored data array region).

Thus, in an embodiment, the data values for the data array region are generated and written to the storage one data position (e.g. one sampling point position) at a time, and when a new value or values for a data (sampling) position is being written to the storage (e.g. buffer), a corresponding signature generation using that new data value or values is performed to generate a current version of the signature representative of the content of the data region. In other embodiments, it may be possible to generate and write to the storage the data values for the data array region at more than one data position at a time.

Thus, in an embodiment, a "current" signature representative of the current content of the region of the data array in question is maintained as the region of the data array is being generated and stored, and that "current" signature is updated each time a new data value for the region of the data array is generated and stored. In other words, the system in effect maintains a "running" signature for the region of the data array and updates that running signature each time a new data value is generated and stored for the data array region.

The signature generation operation itself can be performed in any suitable and desired manner, e.g. depending upon the form of the signature that is being used. The signature generation process should at least take as an input the current data value (the new data value) that has been generated and is being written to the data array, but it may also have other inputs and/or parameters that are considered (and in an embodiment this is the case).

In an embodiment, as well as taking account of the new data value that has been generated and is being stored for a given data position of the region of the data array, the signature generation process also takes account of and/or considers any previously stored data value for the data position (or positions) in question. For example, both the new data value and the old (previously stored) data value for the data position in question could be used as inputs to the signature generation process (and in an embodiment, this is what is done).

The Applicants have recognised in this regard that in many cases when a data array (or a region of a data array) is being generated, it may be that for given data positions within the data array more than one data value will be generated as the data array is being generated, with, e.g., later data values replacing earlier data values for a given data position. This will be the case, for example, for render outputs, such as frames, in graphics processing systems, where it can be relatively common for earlier data values, e.g. representing particular graphics primitives, to be overwritten by later values for later graphics primitives for the render output in question that are, e.g., closer to the viewer.

The signature generation process taking account of any data values that are already stored for a data position allows the overall signature generation process to take account of this possibility that a data value for a given data position that was, e.g., used to derive the "current" signature for the region of the data array, may subsequently be replaced by a new data value or values for that data position (in which case, the Applicants have recognised, the generated signature for the region of the data array should be based on the new data value for the data position in question, not the previous but now replaced data value).

The signature generation process can take account of the previous data value for a data position in any suitable and desired manner.

In one embodiment, the new data value and the old data value for the data position in question are compared and/or combined to provide a data value that reflects the differences (if any) between the old and new values and the resulting data value is then used as an input into the signature generation process.

In another embodiment, a signature value is calculated using the old value for the data position, and a separate signature value is calculated using the new value for the data position, and then the two so-derived signature values are compared and/or combined to provide a signature value that reflects the differences (if any) between the old and new values, and the resulting "combined" signature value is then used as a signature value for the data array region.

In an embodiment of these arrangements, the difference between the new and old data values, and/or the "new" and "old" signature values, is determined using an XOR function to thereby provide an updated data value or signature value that reflects the differences between the old and new data values for the data position in question. Functions other than an XOR function may be used depending on how a signature value is generated. For example, if a signature for a region of a data array is generated by addition of all data values in the region of the data array, then the difference between the new and old data values, and/or the "new" and "old" signature values, can be determined by subtraction.

In an embodiment, the signature generation process also or instead (and in an embodiment also) takes account of the position within the region of the data array that the new data value has been generated for and is being stored for. In other words, the signature generation process in an embodiment takes account of the position of the data position that is currently being updated when a new data value is generated and stored for the region of the data array.

Thus, in an embodiment, position information (the position) of the data position for which a new data value has been generated and is being stored is used as an input and/or parameter for the signature generation process. This is, in an embodiment, in addition to using the new and old data values for the data position in question as inputs to the signature generation process.

The Applicants have recognised in this regard that in many cases when a data array is being generated, it will not and need not necessarily be the case that the data values for the data positions in the data array will be generated in any particular order. Rather, it can be the case that data values are effectively generated at random for positions within the data array as the overall data array is being generated. This will be the case, for example, for render outputs of graphics processing systems, as in that case, any given sampling position value can be generated at any given time (the sampling position values are not required to be generated in any particular or consistent order).

Using the position of the data position whose value has been generated and is being stored as an input to the signature generation process allows the signature generation process to take account of the fact that the data values may, in effect, be written to random (or at least unpredictable) positions within the region of the data array. This can then allow, for example, signature generation functions, such as CRCs, that are, inter alia, dependent upon the order or position of the data values that they are processing, to still be used in the arrangements of the technology described herein.

Thus, in an embodiment, the function used for the signature generation is capable of generating a signature for a data array region for input data values of the data array region that are generated in an unpredictable (e.g. random) data position order.

The signature generation process can take account of the position of a data position for which a data value has been generated and is being stored in any desired and suitable manner, e.g. depending upon the function that is used for the signature generation process.

In one embodiment, the signature generation function take account of the position of a data position for which a data value has been generated by combining and in an embodiment by concatenating the data value and position of the data position that the data value relates to (and then, e.g., and in an embodiment, performs some further processing on the so generated value, such as, and in an embodiment, to randomise the value). The position and data value can be combined, e.g. concatenated, in any suitable and desired manner, such as, and in an embodiment, using an OR or XOR operation. In an embodiment, this is done where the signature generation function is, for example, a hash function.

In the case where the signature generation function is dependent upon the order of the data values, for example if the signature generation for a data value for a given data position is dependent upon the data value of a preceding data position (such as could, e.g., be the case for a CRC calculation), then the signature generation process in an embodiment takes account of the position of the data position that is being updated, if necessary, by using appropriate padding data values (such as data values comprising all zeros) for any and all preceding data positions to the data position that is being updated (in the order of the signature generation operation). In other words, the signature generation process in an embodiment pads the data sequence needed for the signature generation process for the position of the data position that is being considered with appropriate padding values for any other data positions that are needed for that signature generation process.

In an embodiment, the signature generation process also takes account of and/or uses the existing signature (value) (if any) for the data array region in question. For example, both a signature derived using the new data value for the region and the existing (current) signature value for the data array region could be used as inputs to the signature generation process (and in an embodiment, this is what is done).

Thus, in an embodiment, a signature value is generated using the newly generated data value for the region of the data array (in an embodiment together with, as discussed above, the old data value for the data position in question and information indicative of the data position that is being updated), and then that signature value for the new data value is combined with the current signature value for the region of the data array, to provide an updated signature for the region of the data array that, in effect, has updated the existing signature value for the data array with the new signature value for the new data value.

In other words, in an embodiment, a signature "update" value is derived by performing a signature generation process using the new data value, and then that signature "update" value is combined with the existing signature for the data array region to provide an updated signature for the data array region. This then has the effect of updating the overall signature for the data array region with the appropriate modification to the existing signature value for the newly generated and stored data value.

The resulting "combined" ("updated") signature value is then used as the current signature value for the data array region (and that will be correspondingly updated when a new data value is generated and stored for the data array region, and so on).

In an embodiment, in these arrangements the signature "update" value generated using the new data value and the existing signature value for the data array region are combined using an XOR function to thereby provide the updated signature for the data array region that reflects the newly written data value. Other combining functions are of course possible as desired.

The "current" signature for the data array region (that is being maintained as the data array region is being generated and stored) should be stored appropriately in association with and for the data array region. Thus it can, for example, be stored in local storage associated with the signature generation operation. Other arrangements would, of course, be possible.

The signature generation process should be, and is in an embodiment, continued (repeated) as new data values for the region of the data array are generated and stored, until the generation of the region of the data array has been completed, at which point the current content-indicating signature for the data array region at that time will be used as the content-indicating signature for the data array region.

Thus, in an embodiment, the method of the technology described herein further comprises (and the apparatus is correspondingly configured to):

- generating another data value or values for a data position of the region of the data array;
- writing the another data value or values for the data position of the region of the data array to the storage that stores the region of the data array as it is being generated; and
- generating a signature representative of the content of the region of the data array in parallel with the another data value or values for the region of the data array being written to the storage.

This process is, in an embodiment, repeated as new data values for the region of the data array are generated and stored, until the generation of the region of the data array has been completed.

Correspondingly, in an embodiment, the method of the technology described herein comprises (and the apparatus is correspondingly configured to):

- generating and storing a region of an array of data, the region of the array of data comprising plural data positions, each data position having an associated data value or values, by:
  - generating data values for data positions of the region of the data array in turn, and;
  - writing newly generated data values for data positions of the region of the data array to storage that stores the region of the data array while it is being generated;
- until a final version of the region of the data array has been generated and stored;
- the method further comprising:
- when a data value or values is written to a data position or data positions of the stored region of the data array, generating a signature representative of the stored data values for the region of the data array using the data value or values; and
- repeatedly generating an updated signature representative of the stored data values for the region of the data array as new generated data values are written to the stored region of the data array (and in an embodiment each time a new generated data value or values is written to the stored region of the data array), until the final version of the region of the data array has been stored.

Correspondingly, in an embodiment

- the data value generating circuitry is configured to generate data values for data positions of the region of the data array in turn; and
- the write circuitry is configured to write newly generated data values for data positions of the region of the data array to the storage that stores the region of the data array while it is being generated;
- until a final version of the region of the data array has been generated and stored;
- and the signature generating circuitry is configured to:
- when a data value or values is written to a data position or data positions of the stored region of the data array, generate a signature representative of the stored data values for the region of the data array using the data value or values; and
- repeatedly generate an updated signature representative of the stored data values for the region of the data array as new generated data values are written to the stored region of the data array (and in an embodiment each time a new generated data value or values is written to the stored region of the data array), until the final version of the region of the data array has been stored.

In these arrangements, although the data value or values are generated for and written to the region of the data array in turn, it will be appreciated that that does not require those values to be generated and written in any particular, e.g. data position, order (and indeed, in an embodiment it is the case that the data values are not generated for the region of the data array in any particular, e.g. predefined, order).

The process may then be, and is in an embodiment, repeated for another region of the data array (if any), and so on, until final versions of the data array regions and corresponding content-indicating signatures have been generated for each region that the data array is divided into.

The process may then be, and is in an embodiment, repeated for another data array, for example for each data array (e.g. frame) of a sequence of data arrays (e.g. frames) that are being generated.

In one embodiment, a single signature that is representative of the content of the region of the data array is generated for a (and for each) respective region of a data array. However, it would also be possible to generate plural signatures for a (and for each) region of a data array (and in other embodiments, this is what is done). For example, where the data values for the data positions in the data array comprise different data channels (e.g. different colour channels in the case of graphics processing), then separate signatures could be generated for the different data channels, if desired.

In an embodiment, the signatures are generated using all the data representing the data values of the data positions of the region of the data array. However, this need not be the case and it would also be possible to generate a signature or signatures for a data array region using some but not all of the data representative of the data values, such as using only a subset of the data representing the data values. For example, signatures based on a selected set of the most and/or least significant bits of the data values for the data positions of the data array could be generated and stored (and in an embodiment this is done).

The signature generation may be implemented as desired. For example, a signature generator (signature generation circuitry) may be implemented as an integral part of the processor, e.g. graphics processing unit (GPU), CPU, video engine (e.g. encoder/decoder), image processor, display controller and/or composition engine of the data processing system that is, e.g., generating the data array (e.g. frame), or there may, for example, be a separate processing element (circuitry) provided (and, e.g. dedicated) for this function.

The content-representing signatures for the data array regions that are generated in the manner of the technology described herein can be used in any suitable and desired manner. In an embodiment, they are used to compare data array (e.g. frame) regions, e.g., and in an embodiment, to assess the similarity or otherwise of the regions being compared. Thus, in an embodiment, the signature of the current data array region is compared with a signature of another data array region to determine if the current data array region is similar to the other data array region. This may be done in any suitable and desired manner, and is in an embodiment done in one of the manners described in, and for the purpose of one or more of the operations described in, the Applicant's earlier UK Patent Application Nos. 2474114 and 2474115.

Thus, in an embodiment, the (final version of the) generated signature for a data array region is compared to a correspondingly generated signature for another data array region to determine if the signatures are (sufficiently) similar, and if it is determined that the signatures are (sufficiently) similar, a particular, e.g. selected, operation in respect of one or both of the data array regions is either performed or not performed (omitted), or modified. The operation could be, for example, the writing of the data array region to memory or the reading of the data array region from memory, or some other processing of the data array region.

The other data array region that the current (new) data array region is compared with may be a region from a different (e.g. preceding) data array, or a different region from the same data array, as desired.

In an embodiment, the signature for the (current) data array region is compared with a signature for a preceding data array region (e.g. from a data array that precedes the current data array in a sequence of data arrays (e.g. frames) that is being generated) that has already been written to external memory to determine if the current data array region is similar to the already stored preceding data array region.

Then, when it is determined that the current data array region is not similar to the other data array region, the current data array region is read from the buffer and written to the external memory for use. On the other hand, when it is determined that the current data array region is similar to the other data array region, it is determined that the other data array region may be reused, and so the current data array region is discarded from the buffer and not written to the external memory.

In one embodiment, the data array regions that are compared correspond to the data array regions that the signatures are generated for (e.g. such that a single content-representing signature is compared for each data array region). However, it would also be possible for each data array region that is to be compared to comprise plural regions of the signature generation process. In this case each data array region that is to be compared may have multiple content-indicating signatures associated with it. In this case the comparison of the signatures for respective data array regions in an embodiment comprises comparing all of the respective signatures for the data array regions in question in an appropriate manner.

The signature comparison process may require an exact match between two signatures (or, e.g., between each respective pair of signatures, where plural signatures are being compared) for the two data array regions to be considered the same or sufficiently similar (e.g. the comparison determines whether the signatures representing the data array regions in question differ at all), but in other embodiments, only a sufficiently similar (but not exact) match, for example, where the difference does not exceed a given threshold, is required for the two regions to be considered to be (sufficiently) similar.

The comparison between a current data array region and another data array region may be performed by any suitable and desired component of the overall data processing system. For example, this could be performed by a CPU, GPU or separate processor (e.g. ASIC) provided in the system (in the system on-chip) or by a display controller for a display, etc. In an embodiment, the system and/or apparatus includes appropriate signature comparison circuitry.

If the generated data array region is to be retained and stored, then in an embodiment, it is written from the "local" storage that was used to store the data array region while it and its corresponding content indicating signature was being generated, to other storage, such as and in an embodiment to some form of external storage, e.g., memory (i.e. that is not local to the data array region generation processor).

In an embodiment, where the data array is a frame (image), e.g. to be displayed, the data array region if it is to be retained is in an embodiment written to a frame buffer, in an embodiment in external memory, that is to store the overall data array, once the generation of the data array region has been completed. The frame buffer may be in dedicated memory for that purpose or it may be part of a memory that is used for other data as well.

If a data array region is to be retained (is not immediately discarded after its generation), then the signature(s) for the data array region is in an embodiment also appropriately stored and associated with the region of the data array to which it relates. In some embodiments the signatures are stored with the data array(s) in memory. Then, when the signatures are to be used, the stored signature(s) for a region may be retrieved appropriately.

The technology described herein may be implemented in any desired and suitable data processing system that is operable to generate data arrays having a plurality of data positions, such as frames to be displayed.

The data processing system that the technology described herein is implemented in may contain any desired, appropriate and suitable elements and components. Thus it may, and in an embodiment does, contain one or more of: a CPU, a GPU, a video processor (video engine/encoder-decoder), a composition engine, an image processor, a display controller, a camera ISP, and appropriate memory for storing the various data arrays (e.g. frames) and other data that is required.

The technology described herein described herein may be implemented in any suitable system, such as a suitably configured micro-processor based system. In some embodiments, the technology described herein is implemented in a computer and/or micro-processor based system.

In some embodiments, the data processing system comprises, and/or is in communication with, one or more memories and/or memory devices that store the data described herein, and/or store software for performing the processes described herein. The data processing system may also include a host microprocessor, and/or a display for displaying images based on the data generated by the data processing system.

The various functions of the technology described herein may be carried out in any desired and suitable manner. For example, the functions of the technology described herein may be implemented in hardware or software, as desired. Thus, for example, the various functional elements, stages etc., of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics/video processor and renderer, such as processors having a "pipelined" rendering arrangement (in which case the renderer will be in the form of a rendering pipeline). It is particularly applicable to tile-based graphics processors, graphics processing systems, video processors, video processing systems, composition engines and compositing display controllers.

It will also be appreciated by those skilled in the art that all of the described embodiments of the technology described herein may include, as appropriate, any one or more or all of the embodiments and features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor, said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed, the technology described herein relates to arrangements for generating a signature that is representative of the content of a data array that comprises plural different data positions, with each data position having an associated data value or values. A number of embodiments of the signature generation process of the technology described herein will now be described in the context of using that process for generating signatures representative of respective regions of frames to be displayed that are being generated in a data processing system, with the so-generated content-representing signatures then being used to assess the similarity between respective regions of different frames, and to control the writing of respective frame regions to external memory based on the assessed similarities.

FIG. 1 shows an exemplary data processing system 100 that can be operated in accordance with the embodiments of the technology described herein.

As shown in FIG. 1, the data processing system 100 includes a central processing unit (CPU) 102, a graphics processing unit (GPU) 101, and a display controller 103 that communicate via an interconnect 104. The CPU, GPU and display controller also have access to off-chip memory 130 for storing, inter alia, frames to be displayed, via a memory controller 105.

In the present embodiment, the GPU 101 is a tile-based graphics processing unit that produces tiles of an output data array, such as an output frame to be generated. The output data array may typically be an output frame intended for display on a display device, such as a screen or printer, but may also, for example, comprise a "render to texture" output of the graphics processor, etc.

The GPU 101 will, for example, generate a sequence of frames for display, which are stored via the memory controller 105 in a frame buffer in the off-chip memory 130.

Then, when the frames are to be displayed, the display controller 103 will read the frames from the frame buffer in the off-chip memory 130 via the memory controller 105 and send them to a display 120 for display.

In the data processing system shown in FIG. 1 and in accordance with the technology described herein, the graphics processing unit 101 comprises a signature generation and comparison stage that generates signatures representative of the content of regions of frames generated by the GPU 101, and then, when a new frame region is to be written to the off-chip memory 130, first compares the signature for the new frame region with the content-indicating signature of the corresponding frame region in a preceding frame that has already been written to the off-chip memory 130 to determine if the new frame region is similar to the region of the preceding frame.

In the present embodiment, the corresponding regions of the current frame and the preceding frame are compared, but it would also be possible to compare different regions of the frames if desired.

In the present embodiment, if the signature of the current frame region matches the signature of the preceding frame region (or the mismatch is below a predetermined threshold), then the current frame region is determined to be similar to the preceding frame region. On the other hand, if there is a mismatch between the signatures of the current and preceding frame region (or the mismatch is above a predetermined threshold), then the current frame region is determined to be not similar to the preceding frame region.

If the current frame region is to be determined to be sufficiently similar to the preceding frame region based on the signature comparison, the new frame region is not written out to the off-chip memory 130, but rather the region of the preceding frame is reused for that frame region. This allows the writing of effectively duplicated frame regions to the off-chip memory 130 to be avoided.

In this way, the present embodiment can avoid write traffic for sections of the frame buffer that do not actually change from one frame to the next (in the case of a game, this would typically be the case for much of the user interface, the sky, etc., as well as most of the playfield when the camera position is static). This can save a significant amount of bandwidth and power consumption in relation to the frame buffer operation.

On the other hand, if the signatures do not match, then the new tile is written to the frame buffer and the generated signature for the tile is also written to memory.

In the present embodiments, the frame regions that are compared (and for which content-indicating signatures are generated) are the "processing" tiles that the GPU 101 produces as its output. Other arrangements would, of course, be possible.

Figure 2:
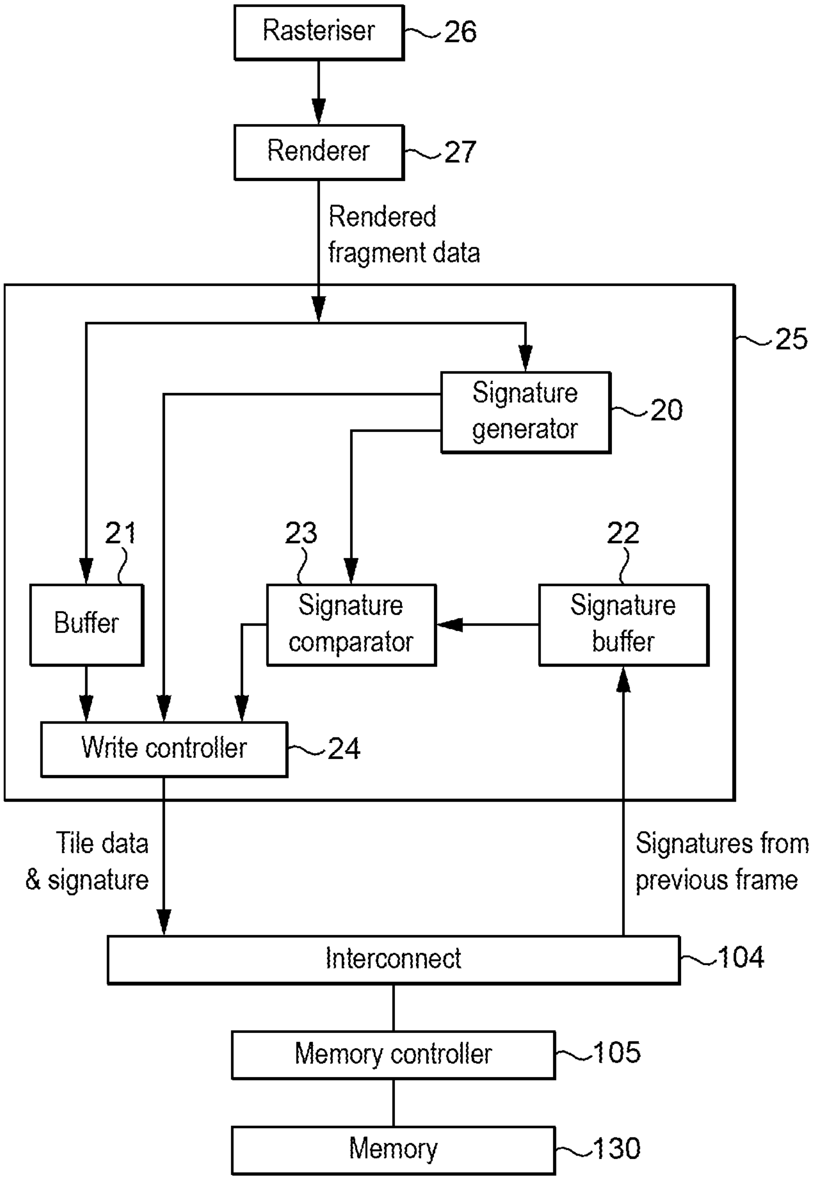
FIG. 2 shows a signature generation and comparison arrangement according to an embodiment of the technology described herein.

FIG. 2 shows the signature generation and comparison arrangement in more detail.

As shown in FIG. 2, the GPU 101 will rasterise graphics primitives to generate fragments to be rendered in a rasterisation stage 26. The graphics fragments will then be rendered in a renderer 27 to produce rendered fragment data for respective sampling positions within the tile that the GPU 101 is currently producing. The rendered fragment data is stored in a tile buffer 21 while the tile is being rendered.

(Although FIG. 2 only shows the rasteriser 26 and renderer 27 of the GPU 101 for simplicity, it will be appreciated that the graphics processing pipeline of the GPU 101 may include any other suitable and desired stages of a graphics processing pipeline that may be used to generate rendered fragment data as desired.)

As shown in FIG. 2, as well as the rendered fragment data generated by the graphics processor 101 being stored in the tile buffer 21, that data is also passed in parallel to a signature generator 20 that operates to generate the content-indicating signature for the tile that is being rendered (this will be discussed in more detail below).

The signature generator 20, as will be discussed in more detail below, generates an updated signature for the tile that is being rendered each time a new rendered fragment data value is written to a sampling position in the tile buffer 21. In other words, the signature generator 20 operates to continuously generate and update a content-indicating signature for the tile that is being rendered whilst the tile data is being rendered into the tile buffer 21.

By performing the signature generation at the same time as new data values are written to the tile buffer, the signature is available effectively immediately upon completion of the tile and the need to provide intermediate storage for the tile for performing the signature generation operation is avoided.

Once the tile has been completely rendered into the tile buffer 21 (i.e. the rendering of the tile has been completed) the final version of the content-indicating signature for the tile that has been generated by the signature generator 20 is passed to a signature comparator 23, which operates to compare the signature of the new tile with the signature of a tile that is already present in the frame buffer in the external memory 130. In the present embodiment, the comparison is with the signature of the tile already in the frame buffer at the tile position for the tile in question. Other arrangements would, of course, be possible.

The signatures for plural tiles from the previous frame are cached in a signature buffer 22 (this buffer may be implemented in a number of ways, e.g. as a buffer or cache) of the signature generation and comparison hardware unit 25 to facilitate their retrieval in operation of the system, and so the signature comparator 23 fetches the relevant signature from the signature buffer 22 if it is present there (or triggers a fetch of the signature from the main memory 130), and compares the signature of the previous frame's tile with the signature received from the signature generator 20 to see if there is a match.

If the signatures do not match, then the signature comparator 23 controls a write controller 24 to write the new tile and its signature to the frame buffer and an associated signature data store in the memory 130. On the other hand, if the signature comparator 23 finds that the signature of the new tile matches the signature of the tile already stored in the frame buffer, then the write controller 24 invalidates the tile and no data is written to the frame buffer (i.e. the existing tile is allowed to remain in the frame buffer and its signature is retained).

In this way, a tile is only written to the frame buffer in the memory 130 if it is found by the signature comparison to differ from the corresponding tile that is already stored in the memory 130. This helps to reduce the number of write transactions to the memory 130 as a frame is being generated.

Figure 3:
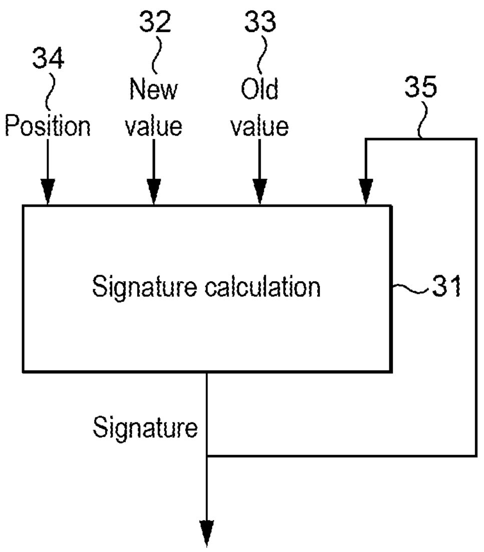
FIG. 3 shows a signature generation method according to an embodiment of the technology described herein.

FIG. 3 shows schematically the signature calculation function that is used by the signature generator 20 of FIG. 2 to generate a signature for a tile (frame region).

In the present embodiments, the signature generator 20 determines an updated signature for the tile that is being written to the tile buffer 21 each time a new data value for a sampling position of the tile is generated and written to the tile buffer 21 (with the version of the signature once all the data values for the tile have been written to the tile buffer 21 then being the final signature value for the tile in question).

To do this, as shown in FIG. 3, each time a new data value 32 is written to a sampling position in the tile buffer 21, the signature generation function 31 takes as its input that new data value 32, the previous ("old") data value 33 for the sampling position in question, the position 34 of the sampling position in question (i.e. for which the new data value is being written), and the existing signature value 35 (the current signature value for the tile in question), and then uses that information to derive an updated signature value for the tile.

Using the new and old data values as inputs to the signature generation process allows for the fact that when a tile is being generated by the graphics processing unit, new data values for a given sampling position within the tile may overwrite previously generated and stored data values for that sampling position.

Using the position of the sampling position that the new data value relates to as an input to the signature generation process allows the signature generation process to take account of the fact that the new data values may be written to any sampling position within the tile as the tile is being generated (rather than, e.g., the data values always being written to the tile buffer in a particular sampling position order).

The exact way that the signature generation operation uses the new and old data values, the position, and the previous signature to derive an updated signature for a tile depends upon the particular form of signature calculation function that is being used. Two embodiments of this operation will now be described with reference to FIGS. 4, 5, 6 and 7.

Figure 4:
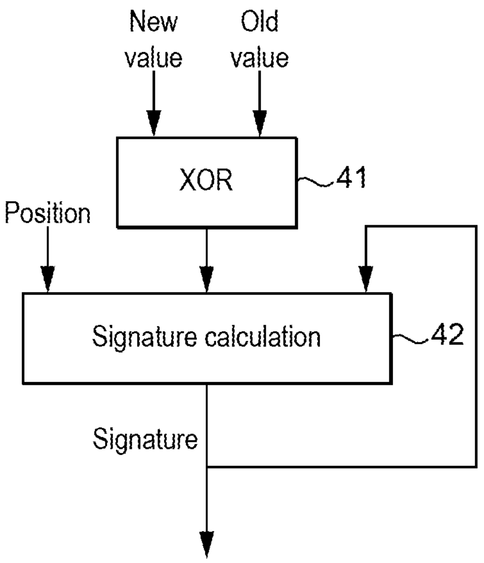
FIGS. 4 and 5 show a signature generation method using a CRC function according to an embodiment of the technology described herein in more detail.
Figure 5:
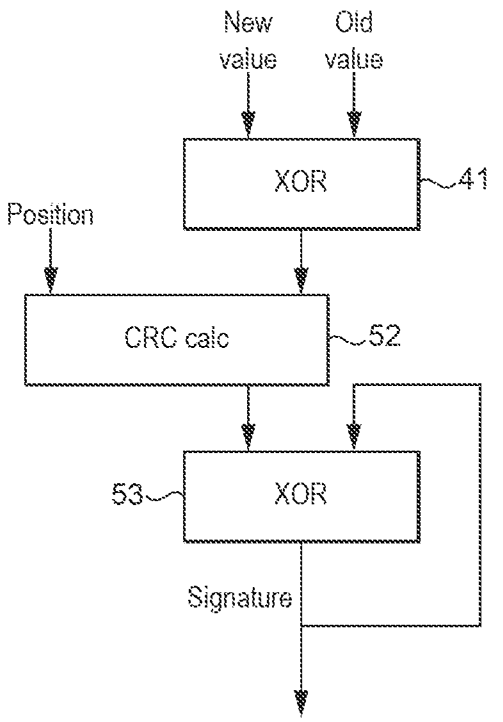
Figure 6:
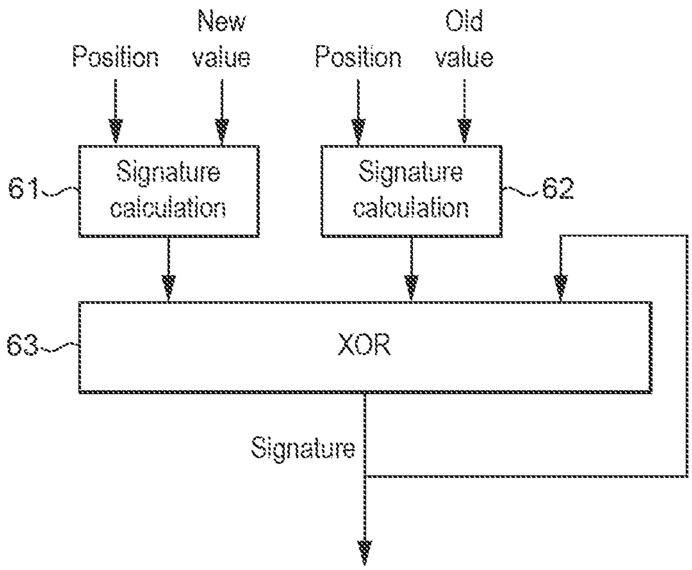
FIGS. 6 and 7 show a signature generation method using a hash function according to an embodiment of the technology described herein in more detail.
Figure 7:
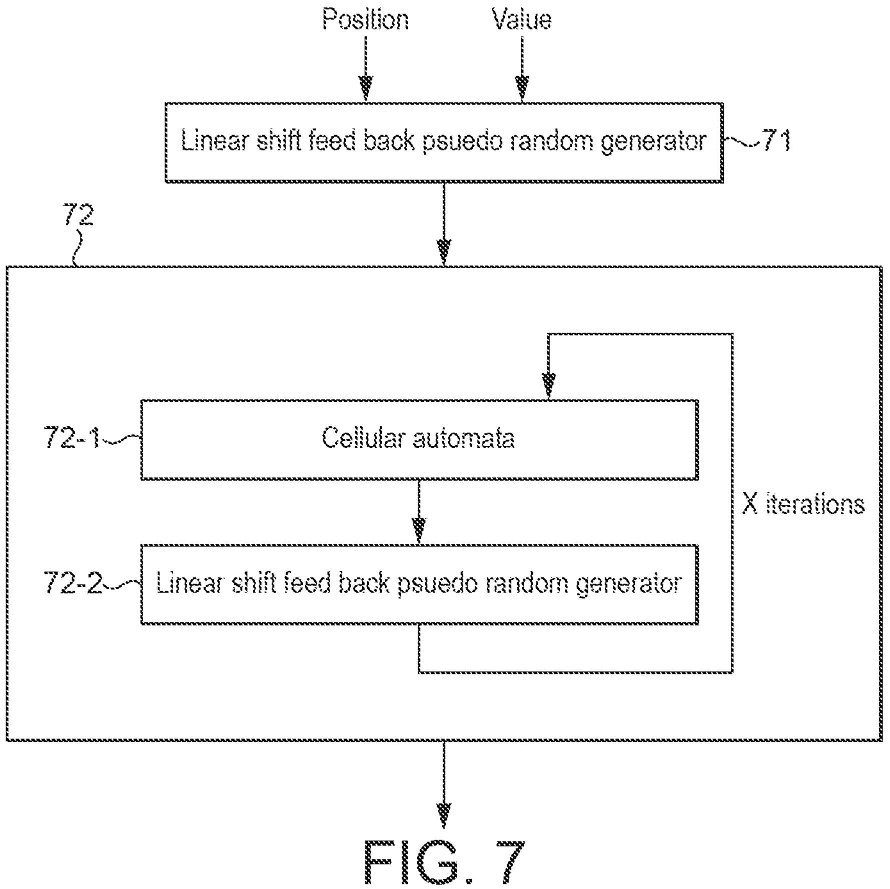

FIGS. 4 and 5 show the operation where the signatures are calculated using a CRC (cyclic redundancy check) function. FIGS. 6 and 7 show an alternative embodiment in which a hash function is used to derive the signatures representative of the content of the tile.

(Other signature generation functions and other forms of signature could also or instead be used, if desired. It would also, for example, be possible to generate a single signature for an RGBA tile, or a separate signature for each colour plane. Similarly, colour conversion could be performed and a separate signature generated for each of Y, U and V.)

As shown in FIGS. 4 and 5, when a CRC function is used to generate signatures for the frame regions, when a new data value is generated for a sampling position of a frame region, an XOR operation 41 is first performed on the newly generated data value and the old data value for the sampling position in question. The output of this XOR operation is input to a signature calculation 42 (FIG. 4) together with the position of the sampling position in question and the current signature for the tile, to generate an updated version of the signature. Here, the "position" may, e.g., be the absolute position of the sampling position within the region of the data array (e.g. an (x, y) coordinate of a pixel within a tile), or a relative position with respect to a reference position, provided that each sampling position within the region of the data array is assigned a unique position.

FIG. 5 shows this latter operation in more detail.

As shown in FIG. 5, the result of the XOR 41 between the newly generated data value and the old data value for the sampling position of the tile is input to a CRC calculation 52 together with the positional information of the sampling position.

The position information for the sampling position that the new data value relates to is used in the CRC calculation to determine how many zeros (padding values) should be appended and/or prepended to the new data value to, in effect, "position" the new data value in the correct position in the overall sequence for the data values for the tile for the CRC calculation. (This is done because a CRC calculation for the final version of the tile (to thereby generate the signature for the final version of the tile) would be applied to the combined data values for each of the sampling positions in the tile when arranged in a particular order. By padding a new data value with zeros based on the sampling position that the new data value relates to, that effectively operates to place that new data value in the correct position in the overall sequence of data values for the tile so that the appropriate CRC value can be derived.) The result of the CRC calculation 52 is then input together with the current signature for the tile to another XOR operation 53. The result of that XOR operation 53 is then the updated (current) signature for the tile.

This operation is repeated each time a new data value is written to the tile buffer, until the tile has been completed.

In this embodiment, any suitable CRC function, such as a known CRC function may be used.

FIGS. 6 and 7 show another embodiment, in which a hash function is used to generate the signature instead of a CRC function.

As shown in FIG. 6, in this embodiment, when a new data value is generated and stored for a sampling position, a first signature calculation 61 that uses the new data value generated for the sampling position and the position of the sampling position in the tile is performed, together with a second signature calculation 62 that uses the old data value of the sampling position and its position. Again, the "position" may, e.g., be the absolute position of the sampling position within the region of the data array (e.g. an (x, y) coordinate of a pixel within a tile), or a relative position with respect to a reference position, provided that each sampling position within the region of the data array is assigned a unique position. The results of the signature calculation 61 and the signature calculation 62 are then XORed 63 together with the current signature for the tile to generate an updated version of the signature for the tile.

This operation is repeated each time a new data value is written to the tile buffer, until the tile has been completed.

The signature calculations 61 and 62 are shown in more detail in FIG. 7. The data value for the sampling position together with its position information are input to a linear shift feedback pseudo random generator 71. The linear shift feedback pseudo random (LSFR) generator 71 performs an initial randomization by concatenating the position and the data value to randomize the values.

The randomised value is then input to an iteration operation 72. In the iteration operation 72, the randomised value output from the LSFR generator 71 is input to cellular automata 72-1 for further randomization. The randomised value from the cellular automata 72-1 is then input to a second linear shift feedback pseudo random (LSFR) generator 72-2 for further randomization. The combination of the LSFR generator 72-2 and the cellular automata 72-1 is arranged so as to better randomise the input value.

The randomization is performed for a number of iterations X. Better randomization may be achieved by more iterations but in practice, as few iterations as possible may be used to minimise the length of time and processing required to obtain a result. It has been found that approximately 4 iterations are sufficient.

The result of the iteration operation 72 is then output as the result of the signature calculation.

The following code corresponds to and is an example of a suitable algorithm for the signature calculations 61 and 62 shown in FIG. 7 (other arrangements would, of course, be possible), where "seed" is a data value, "pos" is the position corresponding to the data value, and "v_curr" is the current signature value generated at the end of the function:

```
uint64 XORshift64_hashCA(uint32 seed, uint64 pos) {
  //Add position
  uint64 v_curr = uint64(seed)|(pos<<32);
  //Initial LSFR randomization
  v_curr ^= v_curr<<10; v_curr ^= v_curr>>15;
  v_curr ^= v_curr<<4; v_curr ^= v_curr>>13;
  for (int I = 0; I < 4; I++) {
    //Celluar Automata
    uint64 vc = v_curr;
    uint64 vn = (v_curr >> 1);// | (v_curr << 63);
    uint64 vp = (v_curr << 1);// | (v_curr >> 63);
    // Execute rule 30
    uint64 v_calc =
      ~vp&~vc&vn| //001
      ~vp&vc|   //010 011
      vp&~vc&~vn //100
      ;
    v_curr = v_calc;
    //LSFR randomization
    v_curr ^= v_curr << 13;
    v_curr ^= v_curr >> 7;
    v_curr ^= v_curr << 17;
  }
  return v_curr;
}
```

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of generating a signature representative of the content of a region of an array of data in a data processing system, the data processing system comprising a graphics processing system, the array of data comprising a render target output generated by the graphics processing system, wherein the region of the array of data comprises plural data positions, each data position having an associated data value or values and having an associated position in the array of data, the method comprising circuitry performing the following:

generating a first rendered data value or values for a data position of the region of the data array;

writing the first rendered data value or values for the data position of the region of the data array to storage that stores the region of the data array as it is being generated;

generating a first signature representative of the content of the region of the data array in parallel with the first rendered data value or values for the data position of the region of the data array being written to the storage, including using the associated position in the array of data of the data position when generating the first signature representative of the content of the region of the data array;

repeatedly generating further rendered data values for the region of the data array in an unpredictable data position order, wherein the further rendered data values may be for the same data position of the region of the data array as the previously generated first data value;

for each further rendered data value, identifying a data position of the region of the data array for said further rendered data value, and determining whether the identified data position of the region of the data array for said further rendered data value is the same as the data position of the previously generated first rendered data value or values; and when it is determined that the identified data position of the region of the data array for the further rendered data value or values is the same as the data position of the previously generated first rendered data value or values:

writing the further rendered data value or values for the data position of the region of the data array to the storage that stores the region of the data array as it is being generated to replace the previously stored first data value or values for the data position of the region of the data array; and generating an updated signature representative of the content of the region of the data array in parallel with the further rendered data value or values for the data position of the region of the data array being written to the storage, wherein the step of generating the updated signature representative of the content of the region of the data array uses: the further rendered data value or values for the data position of the region of the data array, the first rendered data value or values for the data position which had previously been generated and stored for the data position, and the associated position in the array of data of the data position, to generate the updated signature representative of the content of the region of the data array.

2. The method of claim 1, further comprising:

generating data values for data positions of the region of the data array in turn;

writing the data values for the data positions of the region of the data array to the storage that stores the region of the data array as it is being generated; and repeatedly generating an updated signature representative of the content of the region of the data array as new generated data values are written to the stored region of the data array.

3. The method claim 1, wherein the step of generating the updated signature representative of the content of the region of the data array uses a signature generated previously.

4. The method of claim 1, wherein the step of generating the updated signature representative of the content of the region of the data array uses a signature generated using the further rendered data value or values for the data position and representative of the content of the region of the data array.

5. A method of providing a data array for use in a data processing system, the data processing system comprising a graphics processing system, the array of data comprising a render target output generated by the graphics processing system, the data array being formed of one or more regions, each region of the array of data comprising plural data positions, and each data position having an associated data value or values and having an associated position in the array of data, the method comprising circuitry performing the following:

generating a first rendered data value or values for a data position of the region of the data array;

writing the first data rendered value or values for the data position of the region of the data array to storage that stores the region of the data array as it is being generated;

generating a first signature representative of the content of the region of the data array in parallel with the first rendered data value or values for the data position of the region of the data array being written to the storage, including using the associated position in the array of data of the data position when generating the first signature representative of the content of the region of the data array;

storing the first signature to external memory;

repeatedly generating further rendered data values for the region of the data array in an unpredictable data position order, wherein the further rendered data values may be for the same data position of the region of the data array as the previously generated first data value;

for each further rendered data value, identifying a data position of the region of the data array for said further rendered data value, and determining whether the identified data position of the region of the data array for said further rendered data value is the same as the data position of the previously generated first rendered data value or values; and when it is determined that the identified data position of the region of the data array for the further data value or values is the same as the data position of the previously generated first rendered data value or values;

writing the further rendered data value or values for the data position of the region of the data array to storage that stores the region of the data array as it is being generated to replace the previously stored first data value or values for the data position of the region of the data array;

generating an updated signature representative of the content of the region of the data array in parallel with the further rendered data value or values for the data position of the region of the data array being written to the storage, wherein the step of generating the updated signature representative of the content of the region of the data array uses: the further rendered data value or values for the data position of the region of the data array, and the first rendered data value or values for the data position which had previously been generated and stored for the data position, and the associated position in the array of data of the data position, to generate the updated signature representative of the content of the region of the data array; and comparing the new signature representative of the current region of the data array with a signature of a preceding region generated previously and stored in an external memory to determine if the current region is similar to the preceding region.

6. The method of claim 5, comprising discarding the data values generated for the current region of the data array from the storage when it is determined that the current region is similar to the preceding region, or writing the data values generated for the current region of the data array written in the storage to the external memory when it is determined that the current region is not similar to the preceding region.

7. An apparatus for generating a signature representative of the content of a region of an array of data in a data processing system, the data processing system comprising a graphics processing system, the array of data comprising a render target output generated by the graphics processing system, the region of the array of data comprising plural data positions, each data position having an associated data value or values and having an associated position in the array of data, the apparatus comprising:

data value generating circuitry capable of repeatedly generating rendered data values for data positions of a region of a data array to be generated comprising a render target output, the data value generating circuitry generating rendered data values for data positions of the region of the data array in an unpredictable data position order;

storage capable of storing the rendered data values for a region of a data array comprising a render target output as the region of the data array is being generated;

write circuitry capable of writing the generated rendered data values for data positions of a region of a data array comprising a render target output to the storage that stores the region of the data array as it is being generated; and signature generation circuitry capable of generating a signature representative of the content of a region of a data array comprising a render target output that is being generated in parallel with the writing of the rendered data value or values for the region of the data array to the storage;

wherein the write circuitry is operable to, when a new rendered data value or values generated by the data value generating circuitry according to an unpredictable data position order:

identify a data position of the region of the data array for said new rendered data value;

determine whether the identified data position of the region of the data array for said new rendered data value is the same as the data position of a previously generated first rendered data value or values; and when it is determined that the identified data position of the region of the data array for the new rendered data value or values is the same as the data position of the region of the data array for the first rendered data value or values which has previously been generated and written to the storage, write the new rendered data value or values for the data position of the region of the data array to the storage to replace the previously stored first rendered data value or values for the data position of the region of the data array; and wherein the signature generating circuitry is operable to, when the write circuitry has written a new rendered data value or values for a data position of the region of the data array to the storage to replace a previously stored first rendered data value or values for the data position of the region of the data array, generate an updated signature representative of the content of the region of the data array in parallel with the writing of the new rendered data value or values to the storage using: the replaced first rendered data value or values, and the new rendered data value or values, and the associated position in the array of data of the data position, to generate the updated signature representative of the content of the region of the data array.

8. The apparatus of claim 7, wherein the data value generating circuitry generates data values for data positions of a region of a data array in turn, the write circuitry writes the data values for the data positions of the region of the data array to the storage that stores the region of the data array while it is being generated, and the signature generation circuitry repeatedly generates an updated signature representative of the content of the region of the data as new generated data values are written to the stored region of the data array.

9. The apparatus of claim 7, wherein the signature generation circuitry generates the updated signature representative of the content of a region of a data array by using a signature generated using previously generated data value or values for the data position and representative of the content of the region of the data array.

10. The apparatus of claim 7, wherein the signature generation circuitry generates the updated signature representative of the content of a region of a data array by using a signature generated using the new data value or values for the data position and representative of the content of the region of the data array.

11. A system for providing a data array for use in a data processing system the data processing system comprising a graphics processing system, the array of data comprising a render target output generated by the graphics processing system, the data array being formed of one or more regions, each region of the array of data comprising plural data positions, and each data position having an associated data value or values and having an associated position in the array of data, the system comprising:

an apparatus for generating a signature representative of the content of a region of an array of data for a current region of the data array, the apparatus comprising;

data value generating circuitry capable of repeatedly generating rendered data values for data positions of a region of a data array to be generated comprising a render target output, the data value generating circuitry generating rendered data values for data positions of the region of the data array in an unpredictable data position order;

storage capable of storing the rendered data values for a region of a data array comprising a render target output as the region of the data array is being generated;

write circuitry capable of writing the generated rendered data values for data positions of a region of a data array comprising a render target output to the storage that stores the region of the data array as it is being generated;

signature generation circuitry capable of generating a signature representative of the content of a region of a data array comprising a render target output that is being generated in parallel with the writing of the rendered data value or values for the region of the data array to the storage;

wherein the write circuitry is operable to, when a new rendered data value or values generated by the data value generating circuitry according to an unpredictable data position order:

identify a data position of the region of the data array for said new rendered data value;

determine whether the identified data position of the region of the data array for said new rendered data value is the same as the data position of a previously generated first rendered data value or values; and when it is determined that the identified data position of the region of the data array for the new rendered data value or values is the same as the data position of the region of the data array for the first rendered data value or values which has previously been generated and written to the storage, write the new rendered data value or values for the data position of the region of the data array to the storage to replace the previously stored first rendered data value or values for the data position of the region of the data array;

and wherein the signature generating circuitry is operable to, when the write circuitry has written a new rendered data value or values for a data position of the region of the data array to the storage to replace a previously stored first rendered data value or values for the data position of the region of the data array, generate an updated signature representative of the content of the region of the data array in parallel with the writing of the new rendered data value or values to the storage using: the replaced first rendered data value or values, and the new rendered data value or values, and the associated position in the array of data of the data position, to generate the updated signature representative of the content of the region of the data array;

the system further comprising:

a memory external to the apparatus for generating a signature representative of the content of a region of an array of data;

write circuitry capable of writing to the external memory a signature representative of the content of a current region of a data array; and comparison circuitry capable of comparing the signature of a current region with a signature of a preceding region generated previously and stored in the external memory to determine if the current region is similar to the preceding region.

12. The system of claim 11, wherein the comparison circuitry is further capable of causing the apparatus to discard the data values generated for the current region of the data array from the storage when it is determined that the current region is similar to the preceding region, or causing the apparatus to write the data values generated for the current region of the data array written in the storage to the external memory when it is determined that the current region is not similar to the preceding region.

13. The method of claim 1, wherein the signature representative of the content of a region of an array of data is generated by applying a hash function to data values generated for the region.

14. The method of claim 1, wherein the signature representative of the content of a region of an array of data is generated by applying a CRC function to data generated for the region.

15. The system of claim 11, wherein an array of data is a frame and a region of the array of data is a processing tile of the graphics processing system.

16. A non-transitory computer readable storage medium storing computer software code which when executing on a processor performs a method of generating a signature representative of the content of a region of an array of data in a data processing system, the data processing system comprising a graphics processing system, the array of data comprising a render target output generated by the graphics processing system, wherein the region of the array of data comprises plural data positions, each data position having an associated data value or values and having an associated position in the array of data, the method comprising:

generating a first rendered data value or values for a data position of the region of the data array;

writing the first rendered data value or values for the data position of the region of the data array to storage that stores the region of the data array as it is being generated;

generating a first signature representative of the content of the region of the data array in parallel with the first rendered data value or values for the data position of the region of the data array being written to the storage, including using the associated position in the array of data of the data position when generating the first signature representative of the content of the region of the data array;

repeatedly generating further rendered data values for the region of the data array in an unpredictable data position order, wherein the further rendered data values may be for the same data position of the region of the data array as the previously generated first data value;

for each further rendered data value, identifying a data position of the region of the data array for said further rendered data value, and determining whether the identified data position of the region of the data array for said further rendered data value is the same as the data position of the previously generated first rendered data value or values; and when it is determined that the identified data position of the region of the data array for the further rendered data value or values is the same as the data position of the previously generated first rendered data value or values:

writing the further rendered data value or values for the data position of the region of the data array to the storage that stores the region of the data array as it is being generated to replace the previously stored first data value or values for the data position of the region of the data array; and generating an updated signature representative of the content of the region of the data array in parallel with the further rendered data value or values for the data position of the region of the data array being written to the storage, wherein the step of generating the updated signature representative of the content of the region of the data array uses: the further rendered data value or values for the data position of the region of the data array, and the first rendered data value or values for the data position which had previously been generated and stored for the data position, and the associated position in the array of data of the data position, to generate the updated signature representative of the content of the region of the data array.

17. The method of claim 1, wherein the data values for the data positions of the region of the data array are generated in an unpredictable data position order, and the associated position in the data array of the data position is used when generating the signatures representative of the content of the region of the data array to allow signature generation functions that are dependent upon the unpredictable data position order or the position of the data values that they are processing to be used to generate the signatures representative of the content of the region of the data array.

18. The method of claim 5, wherein the data values for the data positions of the region of the data array are generated in an unpredictable data position order, and the associated position in the data array of the data position is used when generating the signatures representative of the content of the region of the data array to allow signature generation functions that are dependent upon the unpredictable data position order or the position of the data values that they are processing to be used to generate the signatures representative of the content of the region of the data array.

19. The apparatus of claim 7, wherein the data values for the data positions of the region of the data array are generated in an unpredictable data position order, and the associated position in the data array of the data position is used when generating the signatures representative of the content of the region of the data array to allow signature generation functions that are dependent upon the unpredictable data position order or the position of the data values that they are processing to be used to generate the signatures representative of the content of the region of the data array.

20. The system of claim 11, wherein the data values for the data positions of the region of the data array are generated in an unpredictable data position order, and the associated position in the data array of the data position is used when generating the signatures representative of the content of the region of the data array to allow signature generation functions that are dependent upon the unpredictable data position order or the position of the data values that they are processing to be used to generate the signatures representative of the content of the region of the data array.

* * * * *